Figures 1, 2:
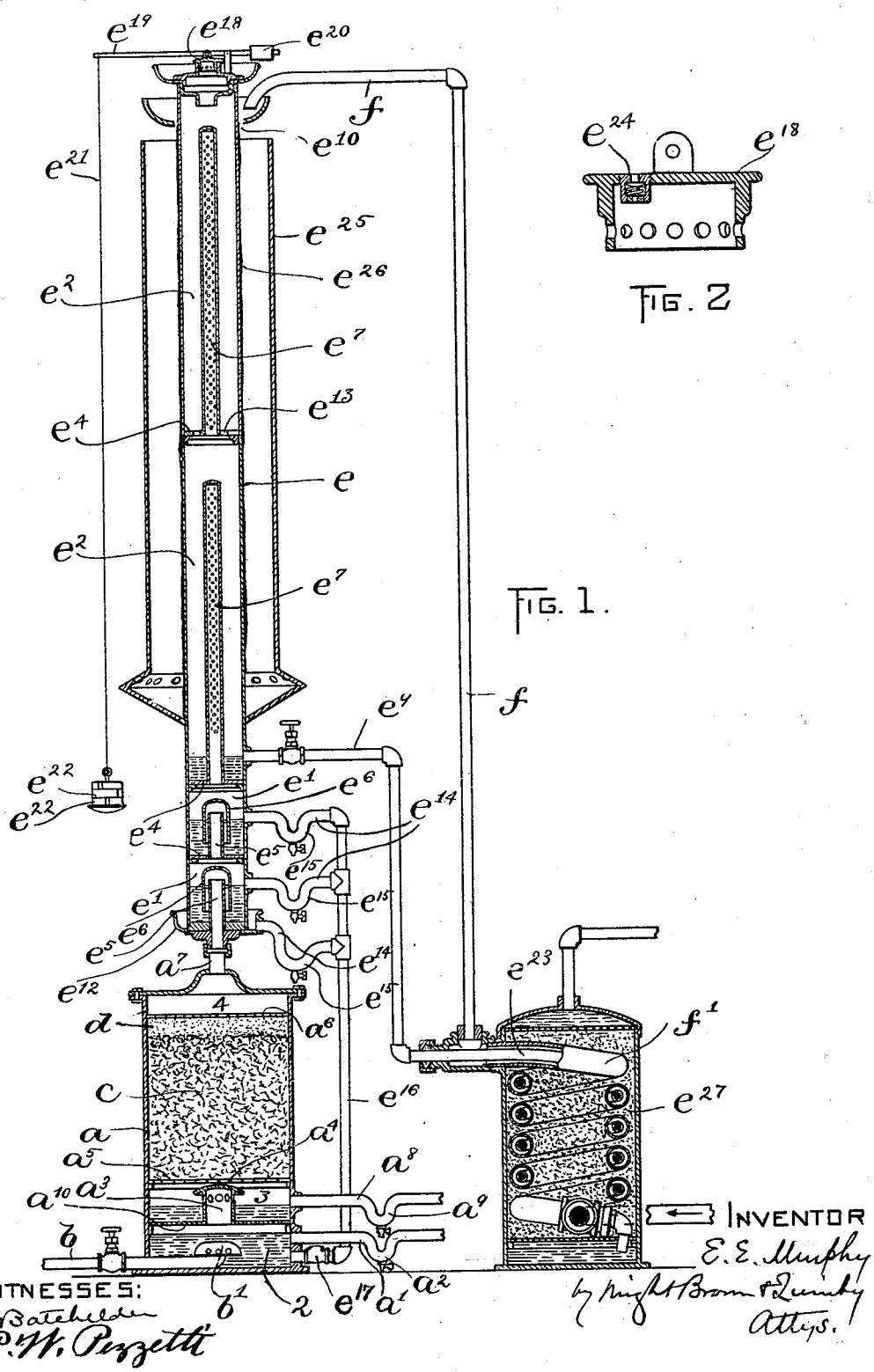

No. 698,724. Patented Apr. 29, 1902.
E. E. MURPHY.
APPARATUS FOR DISTILLING WATER.
(Application filed Dec. 31, 1898.)
(No Model.)

WITNESSES:
INVENTOR
E. E. Murphy

UNITED STATES PATENT OFFICE.

EDWARD E. MURPHY, OF BOSTON, MASSACHUSETTS, ASSIGNOR, BY MESNE ASSIGNMENTS, TO THE PALATABLE WATER STILL COMPANY, OF BOSTON, MASSACHUSETTS, A CORPORATION OF MAINE.

APPARATUS FOR DISTILLING WATER.

SPECIFICATION forming part of Letters Patent No. 698,724, dated April 29, 1902.

Application filed December 31, 1898. Serial No. 700,814. (No model.)

*To all whom it may concern:*

Be it known that I, EDWARD E. MURPHY, of Boston, in the county of Suffolk and State of Massachusetts, have invented certain new and useful Improvements in Apparatus for Distilling Water, of which the following is a specification.

This invention has for its object to provide an improved apparatus for distilling water, whereby water of great purity may be obtained from steam generated in an ordinary boiler, retort, or other apparatus.

The invention involves the passage of the steam through a filtering substance previous to its condensation and the maintaining of a partial condensation of the steam during such passage, whereby a quantity of water is produced which absorbs the impurities carried by the steam.

The invention consists in the improved apparatus for carrying the same into effect, which I shall proceed to particularly describe and claim.

Of the accompanying drawings, forming a part of this specification, Figure 1 represents a vertical sectional view of a distilling apparatus for carrying my invention into effect. Fig. 2 represents a detail sectional view of a valve employed at the upper part of the condensing apparatus.

In the drawings, $a$ represents a casing or receptacle provided at its lower end with a steam-inlet pipe $b$, adapted to be connected with the boiler or other source of steam-supply and terminating inside the casing $a$ in a bell $b'$. The pipe terminates in a lower chamber 2, the roof of which is formed by a partition $a^{10}$ and which communicates with a second chamber 3 through a pipe $a^3$, perforated at its upper end and provided with a roof $a^4$, which overlaps the sides of the pipe and sheds water which may fall on top of the pipe. In issuing from the pipe $b$ the steam first passes through a body of water contained in the lower chamber 2, the said water being supplied from the overflow of certain steam-washing chambers, hereinafter alluded to, and the excess condensing or cooling water, these overflows passing through a pipe $e^{16}$ into the chamber 2. A check-valve $e^{17}$ admits the water into the chamber, but prevents the exit of steam. The chamber 2 has a waste-pipe $a'$, provided with a trap $a^2$. The hot steam entering from the pipe $b$ serves to vaporize more or less of the water in the chamber 2 and in doing so has its temperature reduced. The steam then passes through the pipe $a^3$ into the chamber 3 and up through a body of filtering material $c$, supported on a perforated diaphragm or grating $a^5$. This filtering material must be of such nature as to present a large surface to the action of the steam. Such materials are coke, pumice-stone, and asbestos-wool. An advantageous arrangement of the filtering material is obtained by providing a main layer or body $c$ of coke above the grating $a^5$ and a thinner layer $d$ of asbestos above the coke, the whole being surmounted and held in place by a grating $a^6$, above which is a free chamber 4. The radiation of heat to the surrounding air from the casing $a$ is sufficient to maintain a partial condensation of the steam in its passage through the filtering material, and the resulting water of condensation being in contact with the steam in the pores or interstices of the said material readily absorbs the noxious gases, oil, or other impurities carried over by the steam. The water of condensation collects below the grating $a^5$ in the chamber 3 and may be drawn off through a waste-pipe $a^8$, provided with a trap $a^9$. A suitable oxidizing material or substance, such as iron filings or chips or iron ore, may be intermixed with the filtering material above the grating $a^5$ for the purpose of oxidizing and removing the organic gases contained in the steam.

After being filtered the steam passes from the casing $a$ through a pipe $a^7$ into the lower part of a long stand-pipe or casing $e$, which is divided off by partitions $e^4$ $e^4$ into a number of separate sections or compartments $e'$ $e^2$. The different sections are preferably made separable at these points of division, being screwed or otherwise suitably secured together to provide for interchangeability and also the addition and removal of sections, as well as to render the apparatus capable of being taken apart and easily transported. The two lowermost sections $e'$ constitute washing-chambers for steam, in which the steam is passed through water to remove any slight amount of impurity which may remain after the filtering process. Steam enters the lower of these two chambers from the filtering chamber or casing $a$ through a pipe $e^5$ and passes under a bell $e^6$ through a body of water contained in the chamber and then by a similar route through the second chamber $e'$ above the lower one. The overflow from the chambers $e'$ is carried through pipes $e^{14}$, provided with traps $e^{15}$, into the pipe $e^{16}$, which supplies the chamber 2, as previously stated. From the washing-chambers $e'$ the steam then passes through a long perforated tube $e^7$ into the first of the two condensing-chambers $e^2$ and subsequently into the second condensing-chamber through a similar pipe $e^7$. The water of condensation from the upper condensing-chamber passes through holes $e^{13}$ in the upper dividing-partition $e^4$ into the lower condensing-chamber and is collected at the bottom of the latter.

Condensation is provided for by supplying water from a pipe $f$ at the top of the condensing-pipe $e$ to a trough $e^{10}$, through the perforated bottom of which the water flows in a thin film down around the pipe $e$. The latter may be wrapped with a layer of burlap or similar material $e^{26}$, which soaks up the water and facilitates its ready evaporation. An outer casing $e^{25}$ may further be provided to create a draft around the pipe $e$ and increase the evaporation. The unevaporated condensing water collects in a trough $e^{12}$ at the base of the pipe $e$ and flows through a pipe $e^{14}$, having a trap $e^{15}$, into the pipe $e^{16}$ and thence into the chamber 2.

The hot distillate is drawn off through a pipe $e^9$ and is cooled by the condensing water, the latter being conducted for this purpose through a worm $f'$, interposed in the supply-pipe $f$, and the pipe $e^9$ having a prolongation $e^{23}$, which passes through the worm $f'$. The distillate may then be passed through a charcoal filter $e^{27}$.

At the top of the pipe $e$ I place a valve $e^{18}$, attaching the same to a pivotal lever $e^{19}$, which is counterbalanced with a weight $e^{20}$. To the end of the said lever is attached a cord, chain, or wire $e^{21}$, carrying at its lower end one or more weights $e^{22}$. The addition or removal of the weights $e^{22}$ serves to regulate the pressure inside the pipe $e$. The valve $e^{18}$ is further provided with an inwardly-opening spring-pressed auxiliary valve $e^{24}$, which admits air into the pipe $e$ in case of the formation of a vacuum therein, which might tend to collapse the pipe.

Owing to the fact that the purified or nearly-purified steam passes outward through the perforations of the vertical steam-pipes $e^7$, said steam comes into contact with the inner walls of the casing $e$ throughout the length thereof. The water of condensation descending along the inner wall of the casing $e$ is therefore kept at or near the boiling-point during the whole time that it is in the condensing-chamber with the steam. At this high temperature the distillate is prevented from absorbing any deleterious gases which might have passed into the condensing-chamber with the steam. These gases rise to the top of the chamber and are intermittently ejected when the pressure becomes sufficient to raise the safety-valve $e^{18}$. Therefore the distillate is retained at practically the boiling-point until it is discharged from the condenser through the pipe $e^9$.

I claim—

1. An apparatus of the character specified, comprising an elongated vertical casing having means for supplying a film of water to the outside thereof said outside of the casing being exposed to the atmosphere to permit evaporation of said film, said casing being partitioned to form a plurality of chambers one above another, a vertical perforated pipe in each of said chambers, means for supplying steam to the lower perforated pipe, means whereby steam from the lower pipe that is not condensed in the lower chamber may pass into and through the upper perforated pipe into the upper chamber, means for permitting the escape of water of condensation from the upper chamber into the lower one, and means for drawing off water of condensation from the lower chamber.

2. In an apparatus of the character specified, the filter $c$ and means for supplying steam thereto, the vertical casing $e$ divided into upper chambers $e^2$ and lower chambers $e'$, a connection between the filter and the lower chamber $e'$, both of said chambers $e'$ being connected and each formed to insure the passage of steam through a body of water, the chambers $e^2$ each having a vertical perforated pipe $e^7$ within it, said chambers $e^2$ being connected together and a connection being formed between the lower pipe $e^7$ and the upper chamber $e'$, means for supplying water to the outside of the casing $e$, and means for permitting the escape of gases from the upper end of the upper chamber $e^2$.

In testimony whereof I have affixed my signature in presence of two witnesses.

EDWARD E. MURPHY.

Witnesses:
R. M. PIERSON,
C. F. BROWN.